(12) United States Patent
Diament et al.

(10) Patent No.: US 8,341,212 B2
(45) Date of Patent: Dec. 25, 2012

(54) SERVICE DESCRIPTION REFINEMENT BASED ON ACTUAL SERVICE USE

(75) Inventors: Judah M. Diament, Bergenfield, NJ (US); Arun Kwangil Iyengar, Yorktown Heights, NY (US); Thomas Arthur Mikalsen, Cold Spring, NY (US); Isabelle Marie Rouvellou, New York, NY (US); Ignacio Silva-Lepe, Putnam Valley, NY (US); Revathi Subramanian, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 100 days.

(21) Appl. No.: 12/261,459

(22) Filed: Oct. 30, 2008

(65) Prior Publication Data

US 2010/0114620 A1 May 6, 2010

(51) Int. Cl.
*G06F 15/16* (2006.01)
*G06F 15/173* (2006.01)
*G06F 9/44* (2006.01)

(52) U.S. Cl. ........ 709/203; 709/223; 709/224; 709/225; 709/226; 717/120; 717/121

(58) Field of Classification Search .................. 709/203, 709/223–226
See application file for complete search history.

(56) References Cited

U.S. PATENT DOCUMENTS

| | | | |
|---|---|---|---|
| 2005/0060372 A1 | 3/2005 | DeBettencourt et al. | |
| 2005/0132381 A1 | 6/2005 | Fiammante et al. | |
| 2005/0198188 A1 | 9/2005 | Hickman | |
| 2007/0016897 A1 | 1/2007 | Todd | |
| 2007/0143474 A1 | 6/2007 | Sheng et al. | |
| 2007/0300240 A1 | 12/2007 | Viegener et al. | |
| 2008/0052294 A1 | 2/2008 | Larkin et al. | |
| 2008/0189713 A1 | 8/2008 | Betzler et al. | |
| 2008/0270620 A1* | 10/2008 | Flake et al. | 709/229 |
| 2009/0043789 A1* | 2/2009 | Gupta | 707/100 |
| 2010/0082619 A1* | 4/2010 | Seager et al. | 707/732 |

OTHER PUBLICATIONS

R. Lara et al., "Semantic Web Services: Description Requirements and Current Technologies," Semantic Web Services for Enterprise Application Integration, Sep. 2003, 8 pages.
S. Zhao et al., "Improved Recommendation Based on Collaborative Tagging Behaviors," Procedures of the International ACM Conference on Intelligent User Interfaces (IUI2008), Jan. 2008, pp. 413-416.
D. Kuebler et al., "System and method for performing systems management on IT-resource", 2006, 5 pages.

(Continued)

*Primary Examiner* — Phuoc Nguyen
*Assistant Examiner* — Clarence John
(74) *Attorney, Agent, or Firm* — Preston J. Young; Ryan, Mason & Lewis, LLP

(57) ABSTRACT

Techniques are disclosed for generation and refinement of service descriptions based on records of invocations of the services, i.e., service description refinement based on actual service use. For example, a method for describing one or more services in a service-oriented environment comprised of one or more clients invoking the one or more services comprises the following steps. An initial description is established for at least one of the one or more services. Information is collected from one or more service invocations including at least one of a client identity, a value of at least one parameter, a return value, and an execution time. The information is analyzed to refine the description.

25 Claims, 7 Drawing Sheets

OTHER PUBLICATIONS

R. Lara et al., "Semantic Web Services: description requirements and current technologies," Semantic Web Services for Enterprise Application Integration, 2003, 8 pages.

R. Lara et al., "Discovery and Contracting of Semantic Web Services," Position Paper for the Workshop on Frameworks for Semantics in Web Services, Jun. 2005, 7 pages, Innsbruck, Austria.

S. Zhao et al., "Improved Recommendation based on Collaborative Tagging Behaviors," In Proceedings of the International ACM Conference on Intelligent User Interfaces (IUI2008), 2008, pp. 413-416, Canary Islands, Spain.

JSON Schema Proposal. http://groups.google.com/group/json-schema/web/json-schema-proposal—second-draft, 7 pages.

R.T. Fielding, "Architectual Styles and the Design of Network-based Software Architectures," Dissertation, www.ics.uci.edu, 2000, 90 pages.

\* cited by examiner

SERVICE DESCRIPTION REFINEMENT BASED ON ACTUAL SERVICE USE

FIELD OF THE INVENTION

The present invention relates generally to the automatic description of software artifacts, and more particularly relates to the generation and refinement of service descriptions based on records of invocations of the services.

BACKGROUND OF THE INVENTION

A situational enterprise service is a relatively small, primarily browser-based, intranet-scale situational application. In turn, a situational application is software created for a small group of users with specific needs. The application typically has a short life span, and is often created within the group where it is used, sometimes by the users themselves. As the requirements of a small team using the application change, the situational application often also continues to evolve to accommodate these changes. Significant changes in requirements may lead to an abandonment of the situational application altogether—in some cases it is just easier to develop a new one than to evolve the one in use.

SUMMARY OF THE INVENTION

Illustrative embodiments of the invention provide techniques for generation and refinement of service descriptions based on records of invocations of the services, i.e., service description refinement based on actual service use. While not limited thereto, such techniques are particularly suitable for use with situational enterprise service descriptions.

For example, in one embodiment, a method for describing one or more services in a service-oriented environment comprised of one or more clients invoking the one or more services comprises the following steps. An initial description is established for at least one of the one or more services. Information is collected from one or more service invocations comprising at least one of a client identity, a value of at least one parameter, a return value, and an execution time. The information is analyzed to refine the description.

In another embodiment, a method for describing one or more services in a service-oriented environment comprised of one or more clients invoking the one or more services comprises the following steps. An initial description is established for at least one of the one or more services. Information is collected from one or more service invocations comprising at least one of a client identity, a value of at least one parameter, a return value, and an execution time by adaptively varying a collection procedure to balance an accuracy of information and system performance. The information is analyzed to refine the description. A classification scheme of tags is derived for classifying services in a hierarchy based on the information. The hierarchy is adaptively modified based on the information.

These and other objects, features, and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
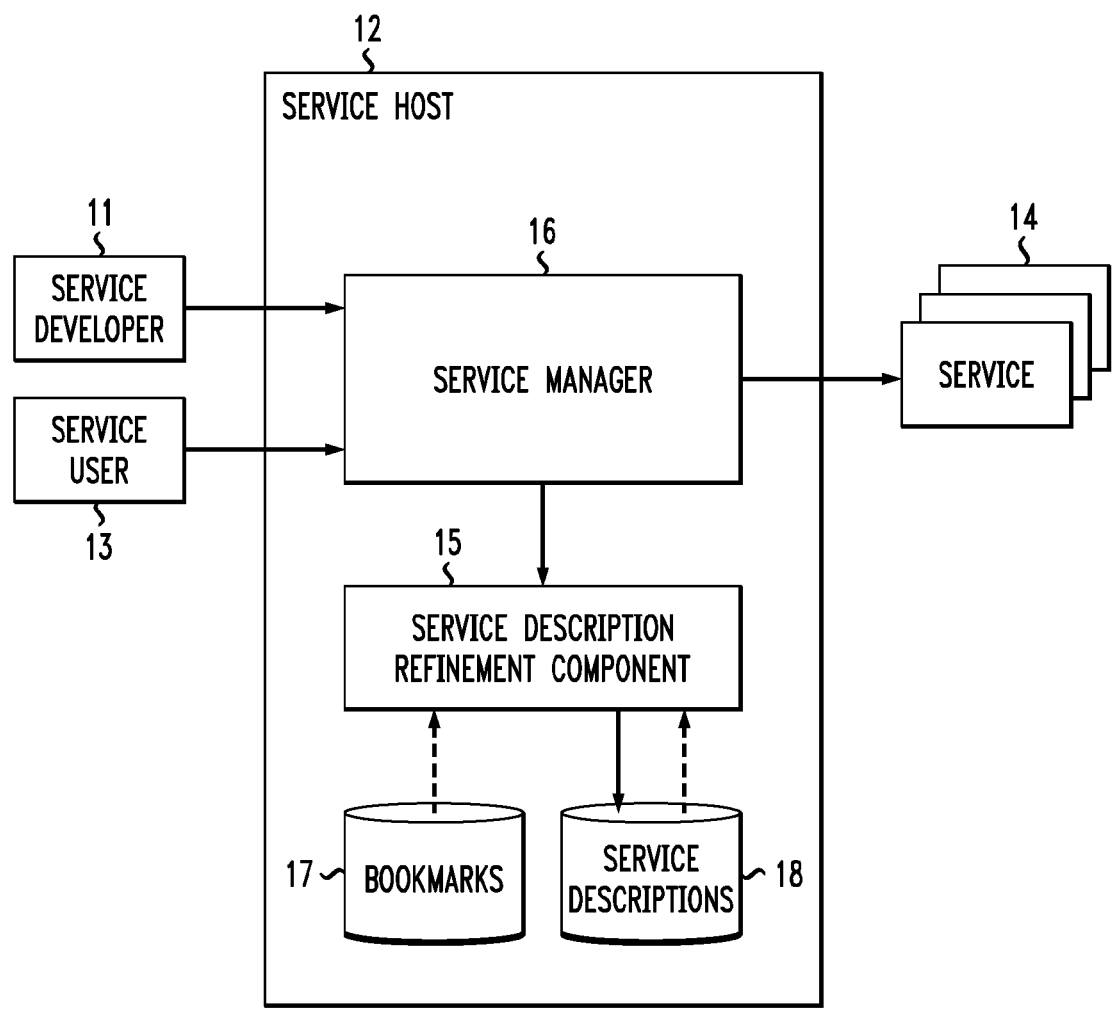
FIG. 1 illustrates a system according to an embodiment of the invention.

While illustrative embodiments will be described herein in the context of situational enterprise service descriptions, it is to be understood that principles of the invention are not so limited and are more generally applicable to other appropriate services.

A situational enterprise service typically exposes a REST (Representational State Transfer) interface through which it is invoked. REST builds on HTTP (HyperText Transfer Protocol) principles to define a software architectural style where entities, containers and behaviors can be seen as resources that are accessible via a uniform interface comprised of a fixed set of verbs. REST was first introduced by Roy T. Fielding in a doctoral dissertation: "Architectural Styles and the Design of Network-based Software Architectures," University of California, Irvine, 2000, the disclosure of which is incorporated by reference herein in its entirety.

More specifically, a situational enterprise service does not use a rigorous language, such as WSDL (Web Services Description Language), to define its interface. Thus, a formal interface is not required to be defined for a situational enterprise service. Rather, informal mechanisms such as a "RESTful" documentation are used to describe a situational enterprise service.

The RESTful documentation of the interface exposed by a situational enterprise service is a stylized syntactic description of the REST resources exposed by the situational enterprise service. For each resource, this description includes information about the data formats of its methods, success and error codes, as well as typical examples of request and response. One representative example of RESTful documentation is given by Project Zero's RESTdoc tool (IBM Corporation, Armonk N.Y.).

A situational enterprise service is also typically annotated with tags for the purposes of content sharing and collaborative filtering. Moreover, tags are used as a form of informal semantic description of situational enterprise services.

Complete and reliable descriptions are a pre-requisite for the discovery of suitable situational enterprise services. On the other hand, it is possible for such descriptions to be incomplete, since formal interfaces are not required for situational enterprise services.

However, we have realized that it is feasible to infer the various items of RESTful documentation (e.g., format, parameters) by example from successful as well as unsuccessful invocations of a situational enterprise service. In other words, given a log of service invocations that include the URL (Uniform Resource Locator) of the service, invocation method, format, parameter values, and success or error codes, it is feasible to synthesize the RESTful documentation of a situational enterprise service.

Principles of the present invention thus provide a method for automatic description of software artifacts. In particular, principles of the present invention provide a method for the generation and refinement of situational enterprise service descriptions based on records of invocations of the situational enterprise services, henceforth referred to as "service" or "services."

In one embodiment, FIG. 1 shows a system having features of the present invention. At least one service developer 11 writes at least one service 14. Services 14 are hosted by at least one service host 12. At least one service user 13 invokes at least one service 14 hosted on at least one service host 12. Service users are sometimes referred to as clients.

Service descriptions are critically important for service users 13 to determine which services 14 to invoke. Principles of the invention provide methods for a system to automatically improve and refine service descriptions based on run-time information. A service may comprise one or more computer programs. The run-time information collected by our system may include but is not limited to information about services 14 invoked by service users 13, one or more parameters passed to a service, whether the service fails, the time for the service to execute, a value returned by a service, identity of a service user, etc.

In the hosted service environment illustrated in FIG. 1, a service manager 16 receives service invocations from service users 13. The service manager 16 forwards a given invocation to the corresponding service 14. After the invocation of the service has completed, and a response is available, the service manager 16 forwards a request/response pair corresponding to the invocation to a service description refinement component 15 that is the focus of the invention. The service host also includes a bookmark store 17 and a service description store 18.

The bookmark store 17 contains bookmarks that refer to services and that are annotated with tags. A bookmark includes the URL of the referred service. Thus, it is possible to retrieve all bookmarks that refer to a service given the service's URL.

The description store 18 contains the descriptions of services that have been created or refined by the system in accordance to the invention. A service description includes a syntactic description and a semantic description.

In a preferred embodiment of the invention, the syntactic description of a service is expressed as a RESTdoc document. In turn, the XML (eXtensible Markup Language) representation of RESTdoc that is targeted by the invention is given by the following instance schema:

```
<application name="string" description="string"?>
  <resource name="string"> +
    <method name="string" description="string" uri="string"> +
      <request> *
        <format name="string"/> ?
        <body> ?
          <example/> * // a string
        </body>
      </request>
      <response> *
        <successCode id="string" description="string"/> *
        <errorCode id="string" description="string"/> *
        <format name="string"/> ?
        <body> ?
          <example/> * // a string
```

-continued

```
        </body>
      </response>
    </method>
  </resource>
</application>
```

In a preferred embodiment of the invention, the semantic description of a service is given by the collection of all tags that may annotate the service. This collection includes tags that may have been directly associated with the service at development or deployment time. We refer to these tags as the immediate tags of the service. This collection also includes any tags that are associated with any bookmark that may refer to the service. We refer to these tags as the bookmark tags of the service.

Figure 2:
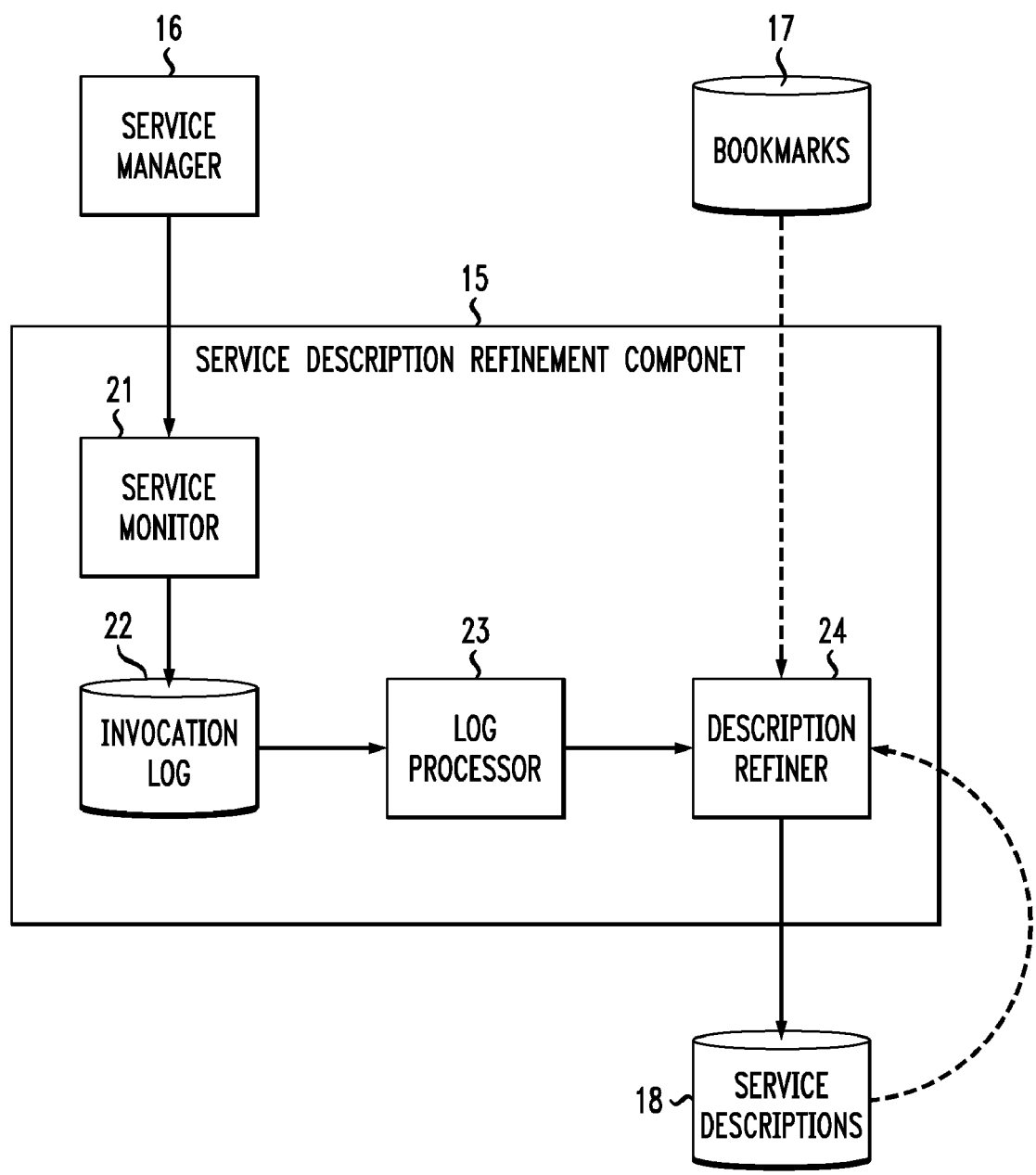
FIG. 2 illustrates a service description refinement component according to an embodiment of the invention.

Referring to FIG. 2, the service description refinement component 15 is comprised of: (1) a service monitor 21, (2) an invocation log 22, (3) a log processor 23, and (4) a description refiner 24.

The service monitor 21 receives a service invocation from the service manager 16 as a request/response pair that it converts into an invocation log record. In a preferred embodiment, the service monitor 21 writes invocation log records to the invocation log 22 directly. The request/response pair that the service monitor 21 receives is given by a pair of data structures, which are accessible via the following interfaces:

```
/** Structure holding an HTTP request. */
public static class HttpRequest
{
  /** The request URL */
  public String          url;
  /** Request method */
  public String          method;
  /** Request headers (may be null) */
  public soalive.utils.MultiMap<String, String> headers;
  /** Response mime/content type */
  public String          contentType;
  /** Request body as an array of bytes (may be null) */
  public byte[ ]         content;
};
/** Structure holding an HTTP response. */
public static class HttpResponse
{
  /** Response status code */
  public int             status;
  /** Response status message */
  public String          message;
  /** Response body as an array of bytes */
  public byte[ ]         content;
  /** Response headers; may be NULL */
  public MultiMap<String, String> headers;
  /** Response mime/content type */
  public String          contentType;
}
```

The service monitor 21 takes a pair of request/response data structures and converts it into a log record with at least the following contents, and writes it to the invocation log 22:

a. resource URL
b. method name
c. request date/time
d. response date/time
e. source service id
f. request format
g. request parameters
h. response format
i. response value
j. success code
k. error codes The log processor 23 is a component that executes in a thread separate from the service monitor 21. The log processor 23 reads log records in order from the invocation log 22 and invokes the description refiner 24 with each log record.

The description refiner 24 takes an invocation log record and uses it to generate or refine the description of a service. Optionally, if a description already exists for a service in the description store 18, as determined by the resource URL of the service, as conveyed by the invocation log record, then the description refiner 24 reads the service description from the description store 18 and in this case it uses the invocation log record to refine the description of the service. Otherwise, the description refiner 24 uses the invocation log record to generate the description of the service.

The refined service description is then stored in service descriptions store 18.

It is also to be appreciated that service descriptions can be further refined based on information provided by a service developer or service user.

Figure 3:
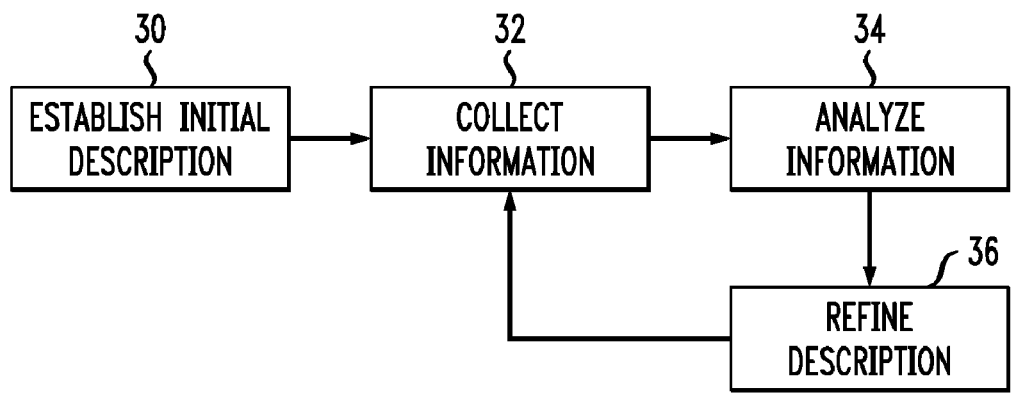
FIG. 3 illustrates a method for refining a service description according to an embodiment of the invention.

FIG. 3 depicts a method for refining a service description in accordance with the present invention. In step 30, an initial description is established. This can be done in several ways. One way is for a service developer 11 to provide an initial description. In step 32, the system collects information as it executes which may be valuable for refining the service description. This information may include but is not limited to information about services 14 invoked by service users 13, one or more parameters passed to a service, whether the service fails, the time for the service to execute, a value returned by a service, identity of a service user, etc. For example, information collected in step 32 might include the following:

- date/timestamp at which service was invoked
- date/timestamp at which service returned
- identity of service user invoking service
- parameters service was invoked with
- return value
- any errors In step 34, the system analyzes the information collected in step 32. In step 36, the service description is refined based on this analysis (note that steps 34 and 36 can be combined into a single step). For example, if a service tends to fail frequently, this can be included in the service description. If it almost never fails, this can also be included in the service description. If certain types of service users (also known as clients) constitute frequent users of the system, this can be added to the service description. Performance information about the service, as well as parameters the service is invoked with, can be included in the service description.

Steps 32, 34, and 36 can be performed in a loop to continuously refine service descriptions. The steps do not have to be performed discretely in a particular order. For example, the system could continuously perform monitoring to collect information. Analysis of the information and service refinement could also be a continuous process.

A key aspect of the invention is that service users 13 can use service descriptions to determine which services to invoke. The descriptions can also be used to develop a classification scheme for services 14. For example, a classification scheme based on tags could be used. The tags could be arranged in a hierarchical fashion. A service could have one or more tags associated with it. The tag hierarchy can be adaptively modified based on the information collected in step 32.

Figure 4:
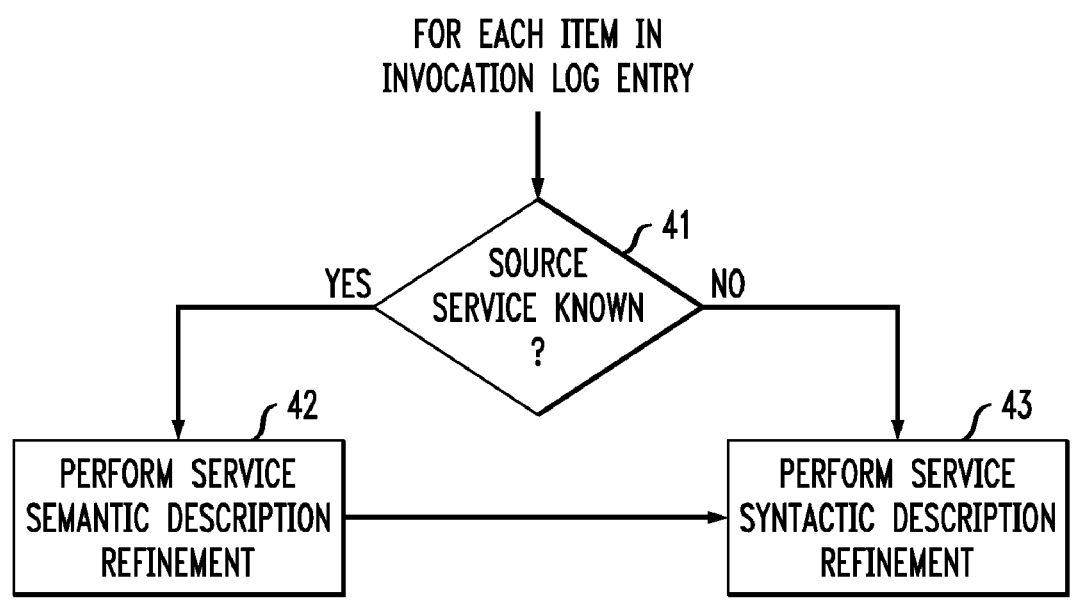
FIG. 4 illustrates a further method for service description refinement according to an embodiment of the invention.
Figure 8:
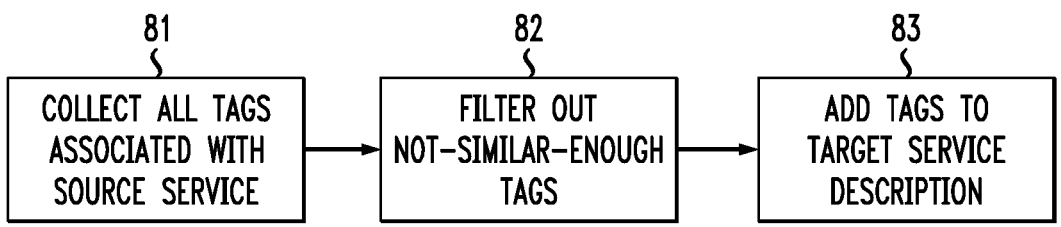
FIG. 8 illustrates a method for semantic service description refinement according to an embodiment of the invention.

As depicted in FIG. 4, if the source service is known (41), as determined by a client identifier in the log record, then the description refiner 24 performs both semantic (42) as well as syntactic description refinement (43). Otherwise, the description refiner 24 performs only syntactic description refinement (43). Syntactic description refinement is depicted in FIG. 5, while semantic description refinement is depicted in FIG. 8.

Figure 5:
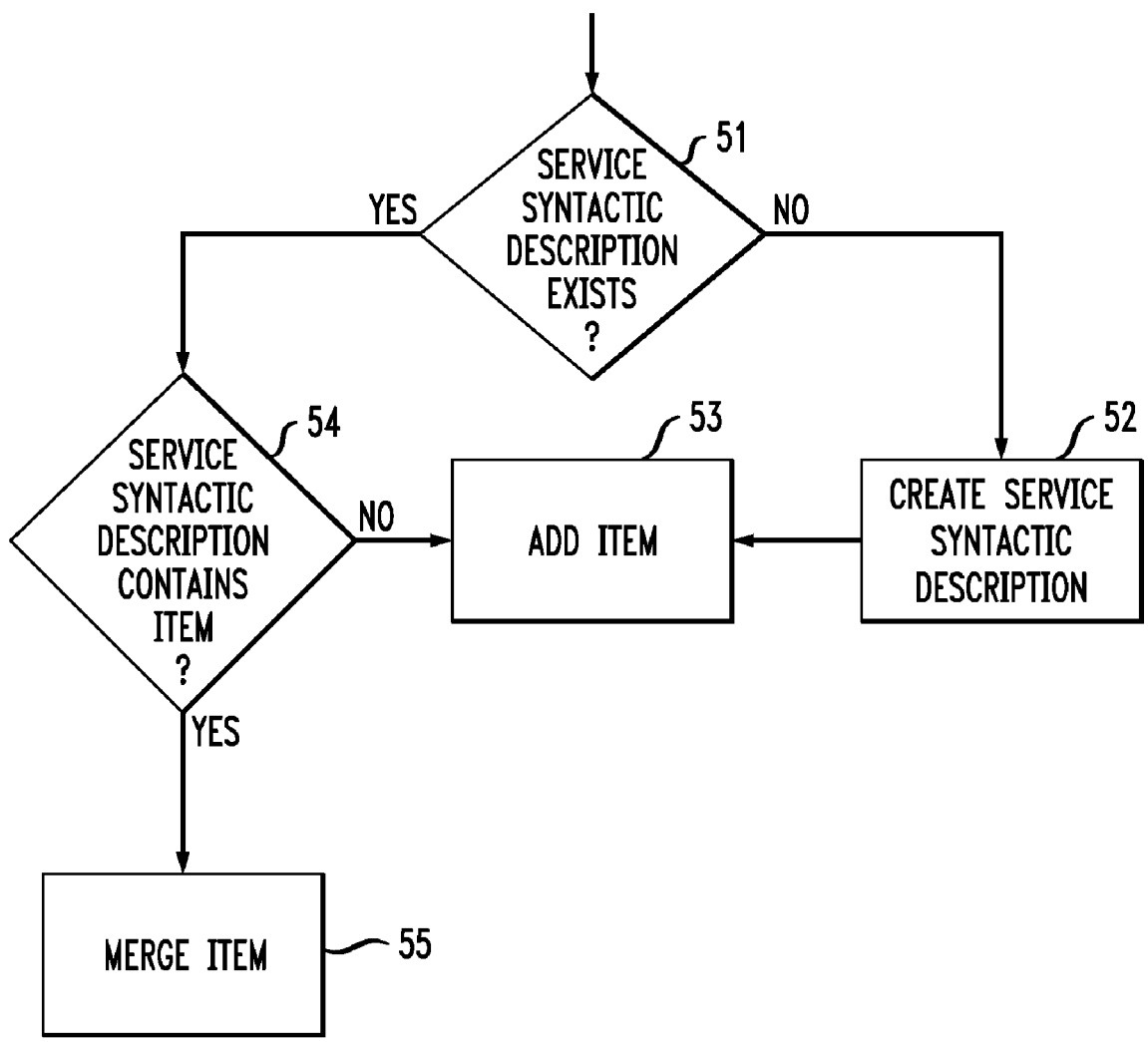
FIG. 5 illustrates a method for syntactic service description refinement according to an embodiment of the invention.

Referring to FIG. 5, the syntactic description refinement first determines if a description already exists for the service referred to by the invocation log record (51). If this is the not case, then an empty description is first created and it uses the items in the invocation log record to populate the description (52). Each item in the invocation record is added (53) to the syntactic description of the service in accordance with the algorithm in FIG. 6. If a description already exists for the service referred to by the invocation log record, then, for each item in the invocation log record, it is determined whether the syntactic description contains the item (54). If this is not the case, then the item is added (53) to the syntactic description of the service in accordance with the algorithm in FIG. 6. If the syntactic description does contain the item, then the item is merged (55) into the syntactic description of the service in accordance with the algorithm in FIG. 7.

Figure 6:
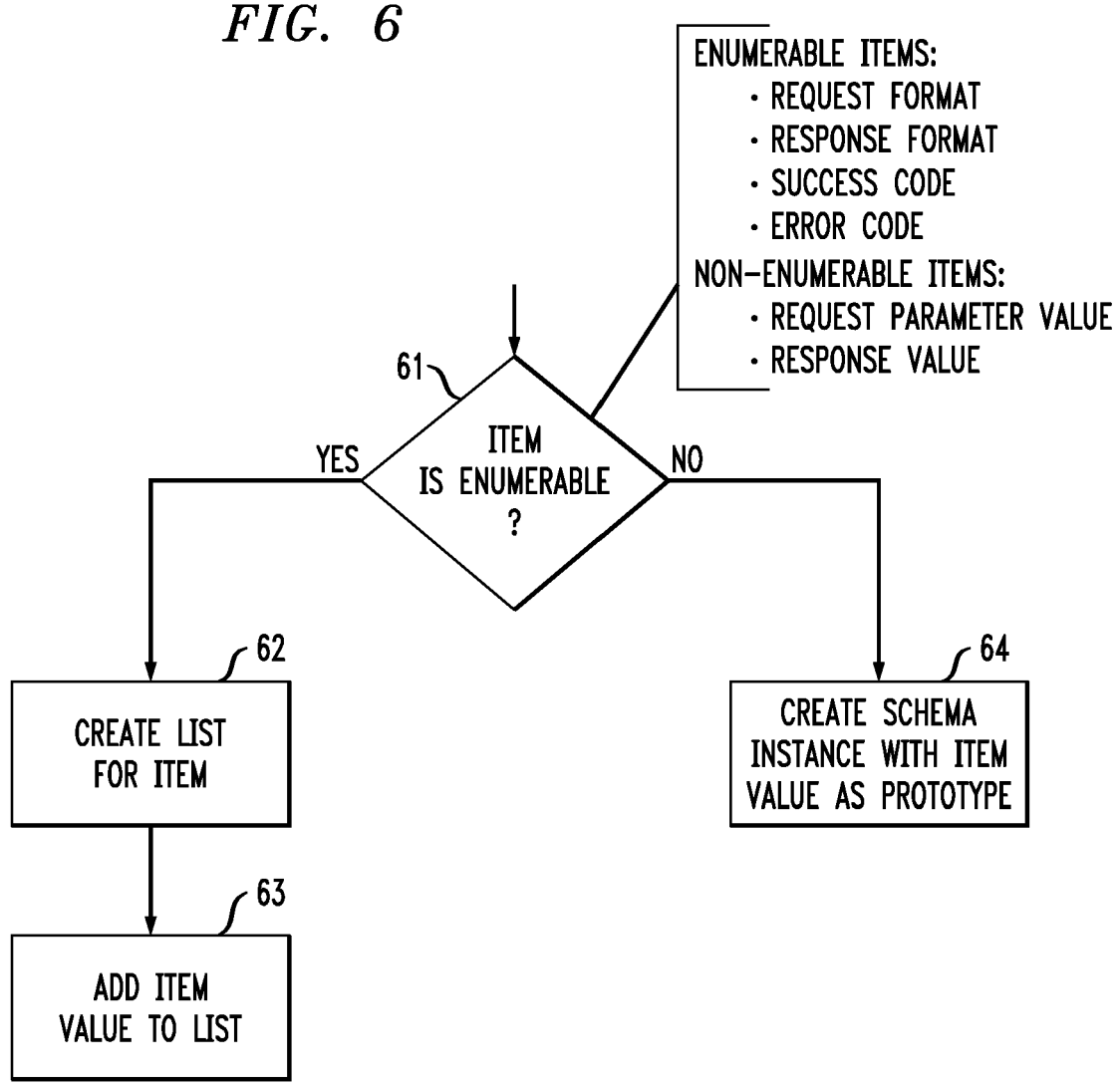
FIG. 6 illustrates a method for adding an invocation log record item to a syntactic description of a service according to an embodiment of the invention.

Referring to FIG. 6, adding an invocation log record item to the syntactic description of a service first determines whether the item to be added is enumerable (61). In a preferred embodiment, an item is enumerable if the number of values it can have is small enough, typically O(100), that it is reasonable to collect each individual value as part of the service description. An example of an enumerable item is the format of the invocation request or response, or the success or error code of the invocation. An example of a non-enumerable item is a request parameter value or a response value. For instance, this could be a value of some primitive data type, such as a string, or a non-primitive data-typed value, such as a JSON (JavaScript Object Notation) object.

If the item to be added is enumerable (61), then a list for the corresponding item is created in the description of the service (62), and the item value is added to the list (63).

If the item to be added is not enumerable (61), then a representative schema of any of its values is created for the item in the service description using the item value as a prototype (64). For example, suppose that the following JSON object is the value of the response value in the invocation log record under consideration:

```
{
    "name":"core",
    "description":"The core team",
    "members":
    [
        "xyz@acme.com",
        "abc@acme.com"
    ]
}
```

Then, a corresponding JSON schema that represents this value would be created as follows:

```
{ "type" : "object",
    "properties" : {
        "name" : { "type" : "string" },
        "description" : { "type" : "string" },
        "members" : { "type" : "array",
            "items" : { "type" : "string" }
        }
    }
}
```

In turn, a concise format of this schema (referred to as instance schema) that would be used for display purposes is as follows:

```
{ "name" : "string",
    "description" : "string",
    "members" : [ "string" ]
}
```

Any JSON schema that is created in accordance to the invention is intended to follow the rules set forth in the JSON Schema Proposal (see JSON Schema Proposal. http://groups.google.com/group/json-schema/web/json-schema-proposal—second-draft, September 2008, the disclosure of which is incorporated by reference herein in its entirety).

Figure 7:
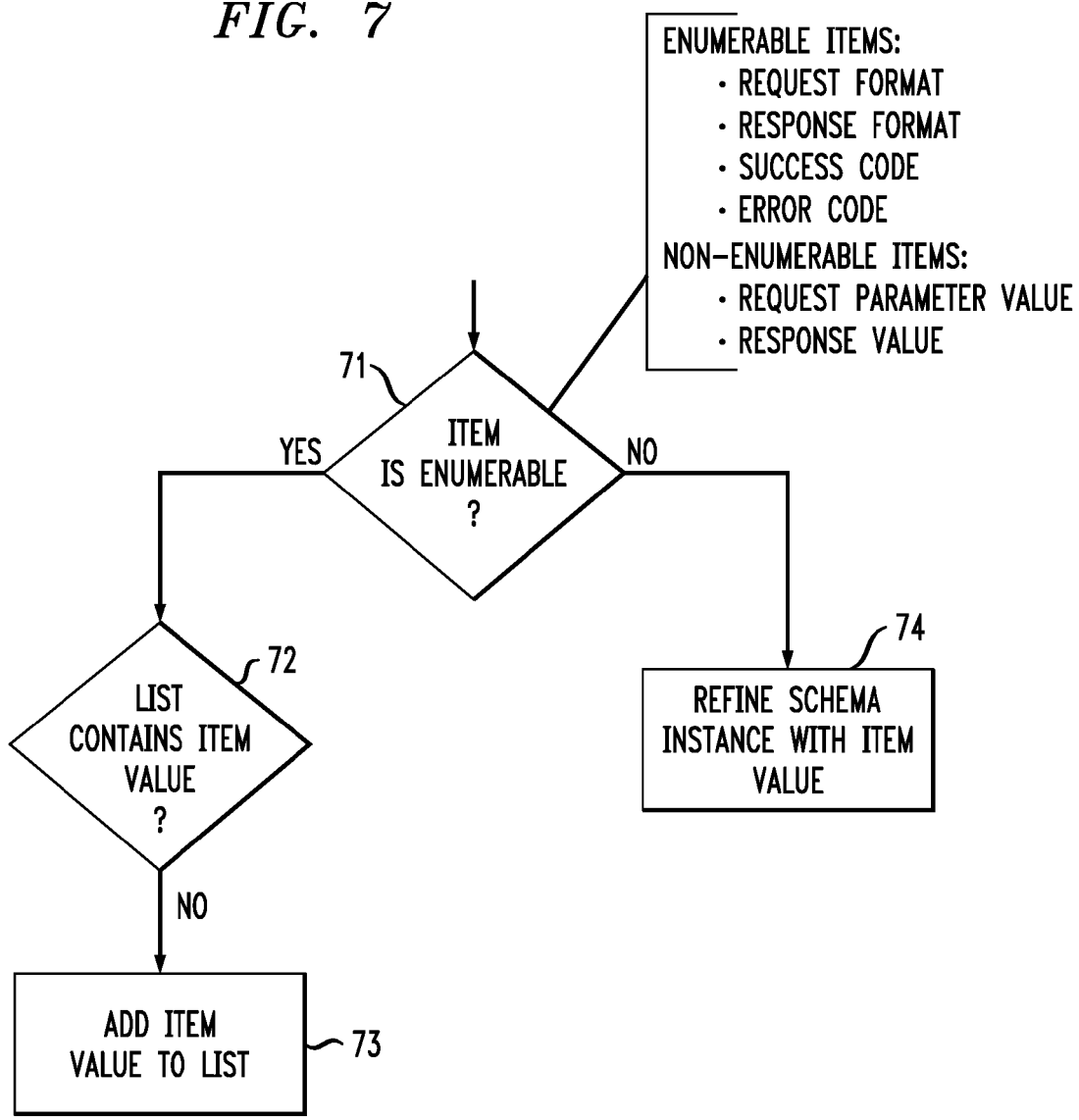
FIG. 7 illustrates a method for merging an invocation log record item to a syntactic description of a service according to an embodiment of the invention.

Referring to FIG. 7, merging an invocation log record item to the syntactic description of a service first determines whether the item to be merged is enumerable (71). If the item is enumerable, and if the list for the item in the description does not already contain the item value (72), then the item value is added to the list (73).

If the item to be merged is not enumerable (71), then the schema corresponding to this item in the service description is refined by augmenting it to cover this item value in addition to the set of values it already covers (74). For example, suppose that the following JSON object is the response value of a subsequent invocation log record for the same service:

```
{
    "name": "core",
    "description": "The core team",
    "members":
    [
        "def@acme.com"
    ],
    "removedmembers":
    [
        "abc@acme.com"
    ]
}
```

Then, the corresponding JSON schema that represents this value would be refined as follows:

```
{ "type" : "object",
    "properties" : {
        "name" : { "type" : "string" },
        "description" : { "type" : "string" },
        "members" : { "type" : "array",
            "items" : { "type" : "string" }
        },
        "removedmembers" : { "description" : "an array of string",
            "type" : "array",
            "items" : { "type" : "string" },
            "optional" : true
        }
    }
}
```

Notice that, since the "removedmembers" property only appears in the second value, then the schema learns it as optional. In turn, the concise format of this schema (or instance schema) that would be used for display purposes becomes:

```
{ "name" : "string",
    "description" : "string",
    "members" : [ "string" ],
    "removedmembers?" : [ "string" ]
}
```

Referring to FIG. 8, the semantic description refinement performs the steps of: (1) collecting all tags associated with the source service (81); (2) filtering out not-similar-enough tags (82); and (3) adding the remaining tags to the target service's description (83).

To collect the tags associated with a service, in particular the source service, all bookmarks that may refer to the service are retrieved. In a preferred embodiment, retrieval of the bookmarks referring to a service uses the URL of the service to lookup all bookmarks that include said URL. The collection of tags associated with a service is then comprised of the service's immediate tags and the service's bookmark tags. That is, the collection contains the tags that may have been directly associated with the service at development or deployment time, as well as all the tags in any bookmark that refers to the service.

To filter out tags, the term not-similar-enough is defined with respect to some measure of similarity. In a preferred embodiment, the measure of similarity used is a function of semantic distance, as given by the lexical meaning of a tag in a public lexical database such as WordNet. More specifically, as explained for example in S. Zhao, N. Du, A. Nauerz, X. Zhang, Q. Yuan and R. Fu, "Improved Recommendation based on Collaborative Tagging Behaviors," In Proceedings of the International ACM Conference on Intelligent User Interfaces (IUI2008), Canary Islands, Spain, 2008, the disclosure of which is incorporated by reference herein in its entirety, the similarity of two tags is inversely proportional to the WordNet distance between the two tags, where the WordNet distance is the shortest path length between the meanings of the two tags. If the semantic distance between a source tag and a target tag is greater than some configurable value, we say that the source tag is not similar enough to the target tag and we filter out the source tag. Filtering out not-similar-enough tags takes each tag from the collection of tags associated with the source service and compares it with all tags in the collection of tags associated with the target service.

A source tag that is similar enough is added to the target service's description by: (1) determining that it does not already exist in the collection of tags associated with the target service; and (2) adding the source tag to the target's collection.

Figure 9:
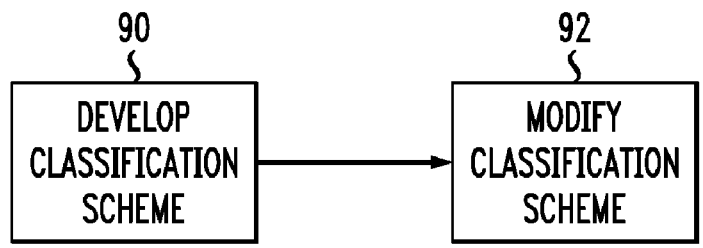
FIG. 9 illustrates a method for classification according to an embodiment of the invention.

FIG. 9 depicts a method for developing a classification scheme in accordance with the present invention. In step 90, an initial classification scheme is developed. In step 92, the classification scheme is modified based on the information collected in step 32 (FIG. 3). That is, information can be maintained on groups of clients which invoke similar services. Services could be classified together if similar clients tend to invoke them.

In an example of classification, a classification scheme could be used that is based on at least one parameter used in the invocation of the service. The actual parameter to be used could be indicated by a user or a tool. If the parameter to be used is enumerable (as defined previously), for instance request format, then services could be classified into an enumeration of categories, one category per parameter value. For instance, if a request format parameter can take values 'JSON' and 'XML', then services that use request format as a parameter could be classified into either a 'JSON' category or an 'XML' category. If the parameter to be used is not enumerable, for instance, a request parameter value, then services could be classified based on whether the corresponding instance schemas for the given parameter value are similar, for some definition of instance schema similarity. From our previous example suppose that service A returns the following JSON object as its response value:

```
{
    "name":"core",
    "description":"The core team",
    "members":
    [
        "xyz@acme.com",
        "abc@acme.com"
    ]
}
``` and suppose that service B returns the following JSON object as its response value:

```
{
    "name": "core",
    "description": "The core team",
    "members":
    [
        "def@acme.com"
    ],
    "removedmembers":
    [
        "abc@acme.com"
    ]
}
``` then, under a definition of instance schema similarity where two instance schemas are similar if one instance schema extends the other, services A and B would be classified under the same category, given that service B's response value instance schema:

```
{ "name" : "string",
    "description" : "string",
    "members" : [ "string" ],
    "removedmembers?" : [ "string" ]
}
``` extends service A's response value instance schema:

```
{ "name" : "string",
    "description" : "string",
    "members" : [ "string" ]
}
```

Figure 10:
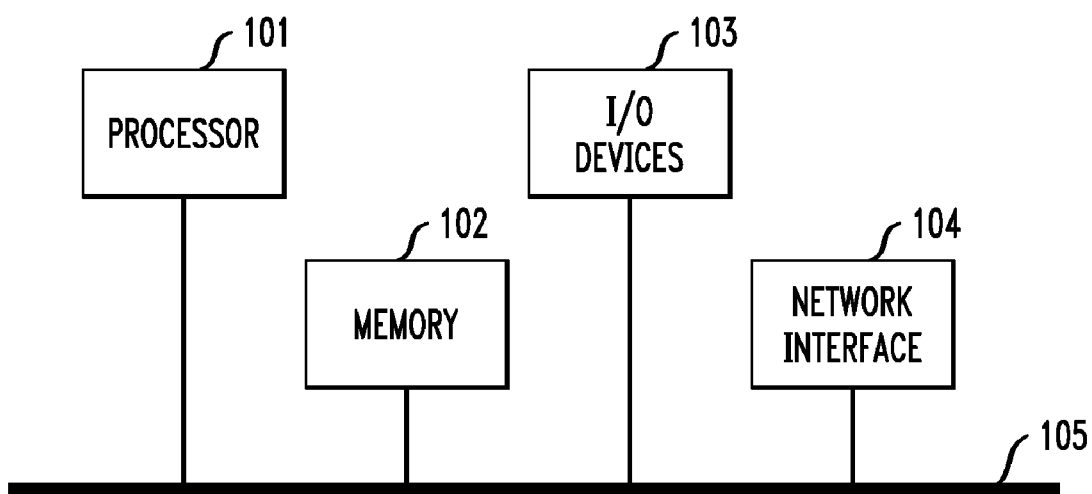
FIG. 10 illustrates a computer system in accordance with which one or more components/steps of the techniques of the invention may be implemented.

Lastly, FIG. 10 illustrates a computer system in accordance with which one or more components/steps of the techniques of the invention may be implemented. It is to be further understood that the individual components/steps may be implemented on one such computer system or on more than one such computer system. In the case of an implementation on a distributed computing system, the individual computer systems and/or devices may be connected via a suitable network, e.g., the Internet or World Wide Web. However, the system may be realized via private or local networks. In any case, the invention is not limited to any particular network.

Thus, the computer system shown in FIG. 10 may represent one or more service developers 11 (FIG. 1), one or more service hosts 12 (FIG. 1), one or more service users 13 (FIG. 1), one or more servers, or one or more other processing devices capable of providing all or portions of the functions described herein. In one particular example, the computer system of FIG. 10 is used to implement service description refinement component 15 (FIG. 1) and its constituent components (FIG. 2).

The computer system may generally include a processor 101, memory 102, input/output (I/O) devices 103, and network interface 104, coupled via a computer bus 105 or alternate connection arrangement.

It is to be appreciated that the term "processor" as used herein is intended to include any processing device, such as, for example, one that includes a CPU and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard disk drive), a removable memory device (e.g., diskette), flash memory, etc. The memory may be considered a computer readable storage medium.

In addition, the phrase "input/output devices" or "I/O devices" as used herein is intended to include, for example, one or more input devices (e.g., keyboard, mouse, etc.) for entering data to the processing unit, and/or one or more output devices (e.g., display, etc.) for presenting results associated with the processing unit.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

In any case, it is to be appreciated that the techniques of the invention, described herein and shown in the appended figures, may be implemented in various forms of hardware, software, or combinations thereof, e.g., one or more operatively programmed general purpose digital computers with associated memory, implementation-specific integrated circuit(s), functional circuitry, etc. Given the techniques of the invention provided herein, one of ordinary skill in the art will be able to contemplate other implementations of the techniques of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for describing one or more services in a service-oriented environment comprised of one or more clients invoking the one or more services, the method comprising the steps of:

establishing an initial description of one or more services;
collecting run-time information from one or more service invocations of said one or more services, wherein run-time information collected from said one or more service invocations comprises at least one of a client identity, a value of at least one parameter, a return value, and an execution time;

analyzing said run-time information collected from said one or more service invocations; and automatically refining the initial description of said one or more services based on said analysis of said run-time information collected and accumulated from said one or more service invocations of said one or more services, wherein automatically refining the initial description comprises automatically refining one of a semantic description and a syntactic description of a schema instance of said one or more services.

2. The method of claim 1, further comprising the step of examining said description to determine a service of the one or more services to invoke.

3. The method of claim 1, further comprising the step of refining said description based on information provided by at least one of a developer and a user.

4. The method of claim 1, wherein the step of analyzing said run-time information further comprises:

finding one or more similar service invocation patterns among the one or more clients; and grouping services of the one or more services invoked by similar clients together.

5. The method of claim 1, further comprising the step of classifying a service of the one or more services based on said description.

6. The method of claim 5, wherein the step of classifying a service further comprises the steps of:

establishing a hierarchy of tags; and associating a service with at least one tag.

7. The method of claim 5, wherein the step of classifying a service further comprises the step of classifying the service based on at least one parameter used in the invocation of the service.

8. An article of manufacture for describing one or more services in a service-oriented environment comprised of one or more clients invoking the one or more services, the article comprising a non-transitory computer readable storage medium including one or more programs which when executed by a computer implement the steps:

establishing an initial description of one or more services;

collecting run-time information from one or more service invocations of said one or more services, wherein run-time information collected from said one or more service invocations comprises at least one of a client identity, a value of at least one parameter, a return value, and an execution time;

analyzing said run-time information collected from said one or more service invocations; and automatically refining the initial description of said one or more services based on said analysis of said run-time information collected and accumulated from said one or more service invocations of said one or more services, wherein automatically refining the initial description comprises automatically refining one of a semantic description and a syntactic description of a schema instance of said one or more services.

9. The article of claim 8, further comprising the step of examining said description to determine a service of the one or more services to invoke.

10. The article of claim 8, further comprising the step of refining said description based on information provided by one of a developer and a user.

11. The article of claim 8, wherein the step of analyzing said run-time information further comprises:

finding one or more similar service invocation patterns among the one or more clients; and grouping services of the one or more services invoked by similar clients together.

12. A method for describing one or more services in a service-oriented environment comprised of one or more clients invoking the one or more services, the method comprising the steps of:

establishing an initial description of one or more services;

collecting run-time information from one or more service invocations of said one or more services, wherein run-time information collected from said one or more service invocations comprises at least one of a client identity, a value of at least one parameter, a return value, and an execution time;

analyzing said run-time information collected from said one or more service invocations; and automatically refining the initial description of said one or more services based on said analysis of said run-time information collected and accumulated from said one or more service invocations of said one or more services, wherein automatically refining the initial description comprises automatically refining one of a semantic description and a syntactic description of a schema instance of said one or more services;

deriving a classification scheme of tags for classifying the one or more services in a hierarchy based on said collected run-time information; and adaptively modifying said hierarchy based on said collected run-time information, wherein the adaptive modification of the description is based on the collected run-time information that has been accumulated from the one or more service invocations.

13. The method of claim 12, wherein the step of analyzing further comprises:

determining which of the clients have similar service invocation patterns; and grouping the one or more services invoked by similar clients together in said hierarchy.

14. The method of claim 12, further comprising the step of examining said description to invoke a service of the one or more services.

15. An article of manufacture for describing one or more services in a service-oriented environment comprised of one or more clients invoking the one or more services, the article comprising a non-transitory computer readable storage medium including one or more programs which when executed by a computer implement the steps:

establishing an initial description of one or more services;

collecting run-time information from one or more service invocations of said one or more services, wherein run-time information collected from said one or more service invocations comprises at least one of a client identity, a value of at least one parameter, a return value, and an execution time;

analyzing said run-time information collected from said one or more service invocations;

automatically refining the initial description of said one or more services based on said analysis of said run-time information collected and accumulated from said one or more service invocations of said one or more services, wherein automatically refining the initial description comprises automatically refining one of a semantic description and a syntactic description of a schema instance of said one or more services;

deriving a classification scheme of tags for classifying the one or more services in a hierarchy based on said collected run-time information; and adaptively modifying said hierarchy based on said collected run-time information;

wherein the adaptive modification of the description is based on the collected run-time information that has been accumulated from the one or more service invocations.

16. Apparatus for describing one or more services in a service-oriented environment comprised of one or more clients invoking the one or more services, the apparatus comprising:

a memory; and a processor coupled to the memory and configured to:
establish an initial description of one or more services;
collect run-time information from one or more service invocations of said one or more services, wherein run-time information collected from said one or more service invocations comprises at least one of a client identity, a value of at least one parameter, a return value, and an execution time;
analyze said run-time information collected from said one or more service invocations; and
automatically refine the initial description of said one or more services based on said analysis of said run-time information collected and accumulated from said one or more service invocations of said one or more services, wherein automatically refining the initial description comprises automatically refining one of a semantic description and a syntactic description of a schema instance of said one or more services.

17. The apparatus of claim 16, wherein the processor is further configured to examine said description to determine a service of the one or more services to invoke.

18. The apparatus of claim 16, wherein the processor is further configured to refine said description based on information provided by at least one of a developer and a user.

19. The apparatus of claim 16, wherein the analysis of said information further comprises finding one or more similar service invocation patterns among the one or more clients, and grouping services of the one or more services invoked by similar clients together.

20. The apparatus of claim 16, wherein the processor is further configured to classify a service of the one or more services based on said description.

21. The apparatus of claim 20, wherein the classification of a service further comprises establishing a hierarchy of tags, and associating a service with at least one tag.

22. The apparatus of claim 20, wherein the classification of a service further comprises classifying the service based on at least one parameter used in the invocation of the service.

23. Apparatus for describing one or more services in a service-oriented environment comprised of one or more clients invoking the one or more services, the apparatus comprising:

a memory; and a processor coupled to the memory and configured to:
establish an initial description of one or more services;
collect run-time information from one or more service invocations of said one or more services, wherein run-time information collected from said one or more service invocations comprises at least one of a client identity, a value of at least one parameter, a return value, and an execution time;
analyze said run-time information collected from said one or more service invocations; and
automatically refine the initial description of said one or more services based on said analysis of said run-time information collected and accumulated from said one or more service invocations of said one or more services, wherein automatically refining the initial description comprises automatically refining one of a semantic description and a syntactic description of a schema instance of said one or more services;
derive a classification scheme of tags for classifying the one or more services in a hierarchy based on said collected run-time information; and
adaptively modify said hierarchy based on said collected run-time information,
wherein the adaptive modification of the description is based on the collected run-time information that has been accumulated from the one or more service invocations.

24. The apparatus of claim 23, wherein the analysis of said information further comprises determining which of the clients have similar service invocation patterns, and grouping the services invoked by similar clients together in said hierarchy.

25. The apparatus of claim 23, wherein the processor is further configured to examine said description to invoke a service of the one or more services.

* * * * *